(12) United States Patent
Huang

(10) Patent No.: US 8,480,510 B2
(45) Date of Patent: Jul. 9, 2013

(54) SLEEVE MEMBER FOR USE IN GOLF CLUB GRIPS AND THE LIKE

(76) Inventor: Ben Huang, Huntington Beach, CA (US)

( * ) Notice: Subject to any disclaimer, the term of this patent is extended or adjusted under 35 U.S.C. 154(b) by 326 days.

(21) Appl. No.: 12/862,673

(22) Filed: Aug. 24, 2010

(65) Prior Publication Data

US 2011/0053704 A1 Mar. 3, 2011

Related U.S. Application Data

(60) Provisional application No. 61/238,062, filed on Aug. 28, 2009.

(51) Int. Cl.
*A63B 53/14* (2006.01)

(52) U.S. Cl.
USPC ........................................................ 473/300

(58) Field of Classification Search
USPC .............. 81/489; 482/49; 473/201, 298, 300, 473/538, 549, 568; 428/60
See application file for complete search history.

(56) References Cited

U.S. PATENT DOCUMENTS

| | | | |
|---|---|---|---|
| 571,025 A | 11/1896 | Spamer | |
| 834,711 A | 10/1906 | Clarke | |
| 979,266 A | 12/1910 | Dean | |
| 1,008,604 A | 11/1911 | Lake | |
| 1,017,565 A | 2/1912 | Lard | |
| 1,139,843 A | 5/1915 | Brown | |
| 1,345,505 A | 7/1920 | Persons | |
| 1,435,088 A | 11/1922 | Smith | |
| 1,480,056 A * | 1/1924 | Flint | 473/309 |
| 1,522,635 A | 1/1924 | Kraeuter | |
| 1,528,190 A | 3/1925 | Howe | |
| 1,617,972 A | 2/1927 | Wallace | |
| 1,701,856 A | 2/1929 | Kraeuter | |
| 1,890,037 A | 11/1930 | Johnson | |
| 1,943,399 A | 1/1934 | Smith | |
| 2,000,295 A | 5/1935 | Oldham | |
| 2,086,062 A | 7/1937 | Bray | |
| 2,103,889 A | 12/1937 | Brisick | |

(Continued)

FOREIGN PATENT DOCUMENTS

| | | |
|---|---|---|
| CN | 2090283 | 12/1991 |
| CN | 2139008 Y | 7/1993 |

(Continued)

OTHER PUBLICATIONS

A. Zosel, Adhession and tack of polymers: Influence of mechanical properties and surface tension, Colloid & Polymer Science 263:541-553 (1985) in 13 pages.

(Continued)

*Primary Examiner* — Gene Kim
*Assistant Examiner* — John E Simms, Jr.
(74) *Attorney, Agent, or Firm* — Knobbe Martens Olson & Bear LLP

(57) ABSTRACT

Disclosed are grips and methods of making grips for use with the handle of an article, and in particular for use with golf clubs, fishing poles, bicycle handles, hand tools, etc. Embodiments preferably include a first portion made of a first material and a second portion made of a second material. The first portion is preferably less dense and/or lighter than the second portion to allow for the manufacture of a light grip with different characteristics.

14 Claims, 8 Drawing Sheets

U.S. PATENT DOCUMENTS

| | | |
|---|---|---|
| 2,115,119 A | 4/1938 | Park |
| 2,149,911 A | 3/1939 | East |
| 2,206,056 A | 7/1940 | Sheesley |
| 2,221,421 A | 11/1940 | Curry |
| 2,225,839 A | 12/1940 | Moore |
| 2,449,575 A | 9/1948 | Wilhelm |
| 2,523,637 A | 9/1950 | Stanfield et al. |
| 2,671,660 A | 3/1954 | Goodwin |
| 2,690,338 A | 9/1954 | Brocke |
| 2,772,090 A | 11/1956 | Brandon |
| 2,934,285 A | 4/1960 | Niehaus |
| 2,984,486 A | 5/1961 | Jones |
| 3,028,283 A | 4/1962 | Lundgren et al. |
| 3,059,816 A | 10/1962 | Goldstein |
| 3,073,055 A | 1/1963 | Edwards et al. |
| 3,087,729 A | 4/1963 | Sullivan |
| 3,095,198 A | 6/1963 | Gasche |
| 3,140,873 A | 7/1964 | Goodwin |
| 3,157,723 A | 11/1964 | Hochberg |
| 3,252,706 A * | 5/1966 | Rosasco, Sr. ................ 473/201 |
| 3,311,375 A | 3/1967 | Onions |
| 3,366,384 A | 1/1968 | Lamkin et al. |
| 3,368,811 A | 2/1968 | Finney |
| 3,503,784 A | 3/1970 | Okayama et al. |
| 3,606,325 A | 9/1971 | Lamkin et al. |
| 3,697,315 A | 10/1972 | Mine |
| 3,857,745 A | 12/1974 | Grausch et al. |
| 3,876,320 A | 4/1975 | Phillipson |
| 3,922,402 A | 11/1975 | Shimamura et al. |
| 3,973,348 A | 8/1976 | Shell |
| 3,992,021 A | 11/1976 | Tobin |
| 4,012,039 A | 3/1977 | Yerke |
| 4,015,851 A | 4/1977 | Pennell |
| 4,052,061 A | 10/1977 | Stewart |
| 4,133,529 A | 1/1979 | Gambino |
| 4,137,360 A | 1/1979 | Reischl |
| 4,216,251 A | 8/1980 | Nishimura et al. |
| 4,284,275 A | 8/1981 | Fletcher |
| 4,347,280 A | 8/1982 | Lau et al. |
| 4,358,499 A | 11/1982 | Hill |
| 4,373,718 A | 2/1983 | Schmidt |
| 4,448,922 A | 5/1984 | McCartney |
| 4,453,332 A | 6/1984 | Wightman |
| 4,535,649 A | 8/1985 | Stahel |
| 4,582,459 A | 4/1986 | Benit |
| 4,613,537 A | 9/1986 | Krüpper |
| 4,651,991 A | 3/1987 | McDuff |
| 4,662,415 A | 5/1987 | Proutt |
| 4,765,856 A | 8/1988 | Doubt |
| 4,878,667 A | 11/1989 | Tosti |
| 4,919,420 A | 4/1990 | Sato |
| 4,941,232 A | 7/1990 | Decker et al. |
| 4,971,837 A | 11/1990 | Martz et al. |
| 5,024,866 A | 6/1991 | Goode |
| 5,055,340 A | 10/1991 | Matsumura et al. |
| 5,118,107 A | 6/1992 | Bucher |
| 5,123,646 A | 6/1992 | Overby et al. |
| 5,127,650 A | 7/1992 | Schneller |
| 5,261,665 A | 11/1993 | Downey |
| 5,322,290 A | 6/1994 | Minami |
| 5,343,776 A | 9/1994 | Falco |
| 5,374,059 A | 12/1994 | Huang |
| 5,396,727 A | 3/1995 | Furuya et al. |
| 5,427,376 A | 6/1995 | Cummings et al. |
| 5,469,601 A | 11/1995 | Jackson |
| 5,474,802 A | 12/1995 | Shimoda et al. |
| 5,480,146 A | 1/1996 | Comer |
| 5,485,996 A | 1/1996 | Niksich |
| 5,511,445 A | 4/1996 | Hildebrandt |
| 5,537,773 A | 7/1996 | Matsubara et al. |
| 5,570,884 A | 11/1996 | Carps |
| 5,571,050 A | 11/1996 | Huang |
| 5,577,722 A | 11/1996 | Glassberg |
| 5,584,482 A | 12/1996 | Huang |
| 5,595,544 A | 1/1997 | Roelke |
| 5,611,533 A | 3/1997 | Williams |
| 5,624,116 A | 4/1997 | Yeh |
| 5,626,527 A | 5/1997 | Eberlein |
| 5,634,859 A | 6/1997 | Nesbitt |
| 5,645,501 A | 7/1997 | Huang |
| 5,671,923 A | 9/1997 | Huang |
| 5,690,566 A | 11/1997 | Bracho |
| 5,695,418 A | 12/1997 | Huang |
| 5,730,662 A | 3/1998 | Rens |
| 5,730,669 A | 3/1998 | Huang |
| 5,753,568 A | 5/1998 | Shimano et al. |
| 5,772,524 A | 6/1998 | Huang |
| 5,781,963 A * | 7/1998 | Maru et al. ................ 16/430 |
| 5,797,813 A | 8/1998 | Huang |
| 5,803,828 A | 9/1998 | Huang |
| 5,813,921 A | 9/1998 | Huang |
| 5,816,933 A | 10/1998 | Huang |
| 5,816,934 A | 10/1998 | Huang |
| 5,827,129 A | 10/1998 | Huang |
| 5,839,983 A | 11/1998 | Kramer |
| 5,851,632 A | 12/1998 | Chen et al. |
| 5,857,929 A | 1/1999 | Huang |
| 5,867,868 A | 2/1999 | Ward |
| 5,890,260 A | 4/1999 | Gaunt |
| 5,890,972 A | 4/1999 | Huang |
| 5,895,329 A | 4/1999 | Huang |
| 5,910,054 A | 6/1999 | Huang |
| 5,924,941 A | 7/1999 | Hagey |
| 5,997,421 A | 12/1999 | Huang |
| 6,036,607 A | 3/2000 | Finegan |
| 6,048,275 A | 4/2000 | Gedeon |
| 6,148,482 A | 11/2000 | Maraman, Jr. |
| 6,197,392 B1 | 3/2001 | Jones |
| 6,226,836 B1 | 5/2001 | Yasui |
| 6,244,975 B1 | 6/2001 | Huang |
| 6,261,191 B1 | 7/2001 | Chen |
| 6,314,617 B1 | 11/2001 | Hastings |
| 6,360,475 B1 | 3/2002 | Lepage et al. |
| 6,361,450 B1 | 3/2002 | Huang |
| 6,386,989 B1 | 5/2002 | Huang |
| D463,520 S | 9/2002 | Ulrich |
| 6,449,803 B1 | 9/2002 | McConchie |
| 6,503,153 B2 | 1/2003 | Wang |
| 6,506,128 B1 | 1/2003 | Bloom, Jr. |
| 6,511,732 B1 | 1/2003 | Chao |
| 6,551,198 B2 | 4/2003 | Huang |
| 6,558,270 B2 | 5/2003 | Kwitek |
| 6,627,027 B2 | 9/2003 | Huang |
| 6,629,382 B2 | 10/2003 | Irrgang et al. |
| 6,629,901 B2 | 10/2003 | Huang |
| 6,635,688 B2 | 10/2003 | Simpson |
| 6,652,398 B2 | 11/2003 | Falone et al. |
| 6,656,054 B2 | 12/2003 | Ulrich |
| 6,656,057 B2 * | 12/2003 | Manual et al. ................ 473/300 |
| 6,663,500 B2 | 12/2003 | Huang |
| 6,666,777 B1 | 12/2003 | Falone et al. |
| 6,676,534 B2 | 1/2004 | Huang |
| 6,695,713 B2 | 2/2004 | Huang |
| 6,709,346 B1 | 3/2004 | Wang |
| 6,733,401 B1 | 5/2004 | Huang |
| 6,762,243 B2 | 7/2004 | Stender et al. |
| 6,827,656 B1 | 12/2004 | Hoeflich et al. |
| 6,843,732 B1 | 1/2005 | Huang |
| 6,857,971 B2 | 2/2005 | Huang |
| 6,908,400 B2 | 6/2005 | Chu et al. |
| 6,973,750 B1 | 12/2005 | Kim |
| 6,974,626 B2 | 12/2005 | Horacek |
| 7,008,582 B2 | 3/2006 | Chen |
| 7,048,644 B2 | 5/2006 | Wang |
| 7,137,904 B2 | 11/2006 | Huang |
| 7,140,973 B2 | 11/2006 | Rohrer |
| D534,602 S | 1/2007 | Norton et al. |
| D534,603 S | 1/2007 | Norton et al. |
| D534,604 S | 1/2007 | Norton et al. |
| D534,605 S | 1/2007 | Norton et al. |
| D534,607 S | 1/2007 | Norton et al. |
| D534,975 S | 1/2007 | Norton et al. |
| D536,048 S | 1/2007 | Chen |
| D538,868 S | 3/2007 | Norton et al. |
| D538,869 S | 3/2007 | Wang et al. |
| 7,186,189 B2 | 3/2007 | Huang |
| 7,195,568 B2 | 3/2007 | Huang |

| | | |
|---|---|---|
| 7,219,395 B2 | 5/2007 | Bigolin |
| 7,344,447 B2 | 3/2008 | Chang |
| 7,344,448 B2 | 3/2008 | Huang |
| 7,347,792 B2 | 3/2008 | Huang |
| 7,374,498 B2 | 5/2008 | Huang |
| 7,404,770 B2 | 7/2008 | Huang |
| 7,438,646 B2 | 10/2008 | Huang |
| 7,448,957 B2 | 11/2008 | Huang |
| 7,448,958 B2 | 11/2008 | Huang |
| 7,458,903 B2 | 12/2008 | Wang et al. |
| 7,470,199 B2 | 12/2008 | Huang |
| 7,491,133 B2 | 2/2009 | Huang |
| 7,527,564 B2 | 5/2009 | Huang |
| 7,566,375 B2 | 7/2009 | Huang |
| 7,585,230 B2 | 9/2009 | Huang |
| 7,770,321 B2 | 8/2010 | Huang |
| 7,862,445 B2 | 1/2011 | Huang |
| 7,862,446 B2 | 1/2011 | Huang |
| 7,980,961 B2 | 7/2011 | Huang |
| 7,985,314 B2 | 7/2011 | Huang |
| 8,003,171 B2 | 8/2011 | Huang |
| 8,201,357 B2 | 6/2012 | Huang |
| 8,360,898 B2 | 1/2013 | Huang |
| 2002/0028325 A1 | 3/2002 | Simpson |
| 2002/0142858 A1 | 10/2002 | Chen |
| 2002/0142900 A1 | 10/2002 | Wang |
| 2002/0151373 A1 | 10/2002 | Beauregard |
| 2002/0173371 A1 | 11/2002 | Lamkin et al. |
| 2003/0040384 A1 | 2/2003 | Falone et al. |
| 2003/0045370 A1 | 3/2003 | Jaw |
| 2003/0062654 A1 | 4/2003 | Lamkin |
| 2003/0139223 A1 | 7/2003 | Ulrich et al. |
| 2003/0148836 A1 | 8/2003 | Falone et al. |
| 2003/0150081 A1 | 8/2003 | Wang |
| 2003/0216192 A1* | 11/2003 | Chu .............................. 473/300 |
| 2003/0228930 A1 | 12/2003 | Huang |
| 2004/0029645 A1 | 2/2004 | Chen |
| 2004/0029646 A1 | 2/2004 | Chu et al. |
| 2004/0031128 A1 | 2/2004 | Chen |
| 2004/0109980 A1 | 6/2004 | Chen et al. |
| 2004/0123429 A1 | 7/2004 | Wang |
| 2004/0185958 A1 | 9/2004 | Huang |
| 2004/0248664 A1 | 12/2004 | Billings |
| 2004/0266546 A1 | 12/2004 | Huang |
| 2005/0123723 A1 | 6/2005 | Wang |
| 2005/0148401 A1* | 7/2005 | Huang .......................... 473/155 |
| 2005/0221909 A1* | 10/2005 | Nam ............................. 473/300 |
| 2005/0229285 A1 | 10/2005 | Chung |
| 2005/0276925 A1 | 12/2005 | Su |
| 2005/0287329 A1 | 12/2005 | Lai |
| 2006/0172815 A1 | 8/2006 | Chu |
| 2006/0252571 A1 | 11/2006 | Wang |
| 2006/0287123 A1 | 12/2006 | Wang |
| 2007/0149307 A1 | 6/2007 | Huang |
| 2008/0039226 A1 | 2/2008 | Chi |
| 2008/0120893 A1 | 5/2008 | Keys et al. |
| 2008/0172839 A1 | 7/2008 | Wang |
| 2010/0022322 A1 | 1/2010 | Huang |
| 2010/0260987 A1 | 10/2010 | Huang |
| 2010/0269626 A1 | 10/2010 | Huang |
| 2010/0273568 A1 | 10/2010 | Huang |
| 2010/0281754 A1 | 11/2010 | Huang |
| 2011/0065524 A1 | 3/2011 | Huang |
| 2011/0077100 A1 | 3/2011 | Huang |
| 2011/0113673 A1 | 5/2011 | Huang |

FOREIGN PATENT DOCUMENTS

| | | |
|---|---|---|
| CN | 2163667 Y | 5/1994 |
| CN | 2288744 | 8/1998 |
| CN | 1332022 A | 7/2000 |
| CN | 2438768 | 7/2001 |
| CN | 2444645 | 8/2001 |
| CN | 2571437 Y | 9/2003 |
| CN | 2596752 Y | 1/2004 |
| CN | 2659497 Y | 12/2004 |
| DE | 36 44 674 A1 | 7/1988 |
| DE | 92 18 550 U1 | 8/1994 |
| FR | 2 731 402 A3 | 9/1996 |
| GB | 2 192 550 A | 1/1988 |
| JP | 53-12061 | 2/1978 |
| JP | 55-43008 | 3/1980 |
| JP | 60-61067 | 4/1985 |
| JP | 3112575 | 5/1991 |
| JP | 7-41731 | 2/1995 |
| JP | 3076015 | 12/2000 |
| JP | 3081404 | 8/2001 |
| JP | 2002-028264 | 1/2002 |

OTHER PUBLICATIONS

U.S. Appl. No. 09/901,747, filed Jul. 9, 2001, (U.S. Pub. No. 2001/0046905), abandoned.
U.S. Appl. No. 13/403,764, filed Feb. 23, 2012, pending.
Design U.S. Appl. No. 29/416,672, filed Mar. 26, 2012, pending.
U.S. Appl. No. 13/526,323, filed Jun. 18, 2012, pending.
The Random House College Dictionary, Revised Edition, 1975, p. 1233, definition of skive.
U.S. Appl. No. 11/029,328, filed Jan. 5, 2005, (U.S. Pub. No. 2005-0148401 A1), abandoned.
U.S. Appl. No. 11/412,196, filed Apr. 25, 2006, (U.S. Pub. No. 2006-0264268 A1), abandoned.
U.S. Appl. No. 12/425,187, filed Apr. 16, 2009, (U.S. Pub. No. 2009-0258722 A1), abandoned.
U.S. Appl. No. 12/426,896, filed Apr. 20, 2009, (U.S. Pub. No. 2009-0258721 A1), abandoned.
U.S. Appl. No. 12/848,052, filed Jul. 30, 2010, pending.
U.S. Appl. No. 13/208,297, filed Aug. 11, 2011, pending.
Design U.S. Appl. No. 29/436,610, filed Nov. 7, 2012, pending.
U.S. Appl. No. 13/750,853, filed Jan. 25, 2013, pending.

* cited by examiner

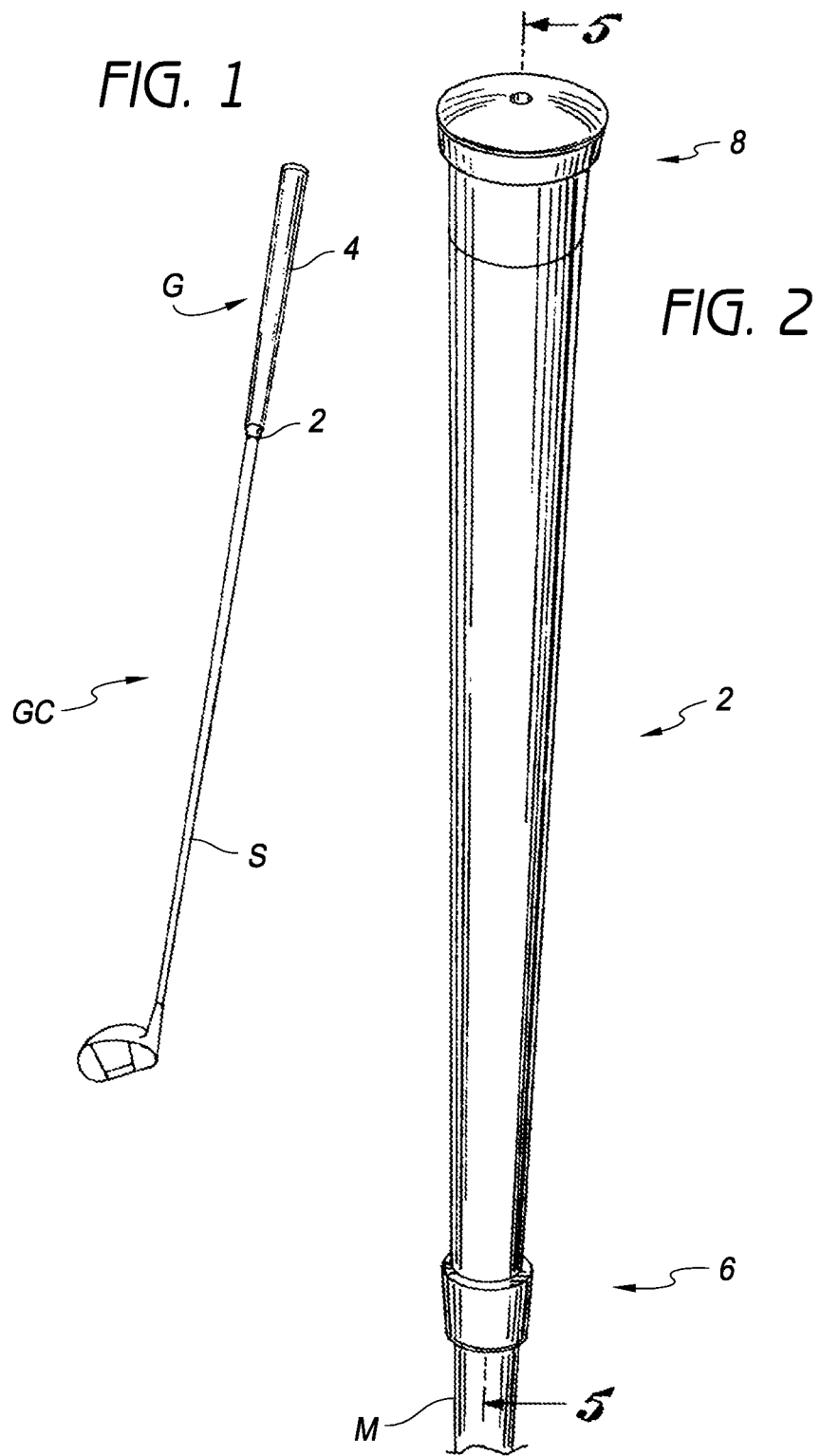

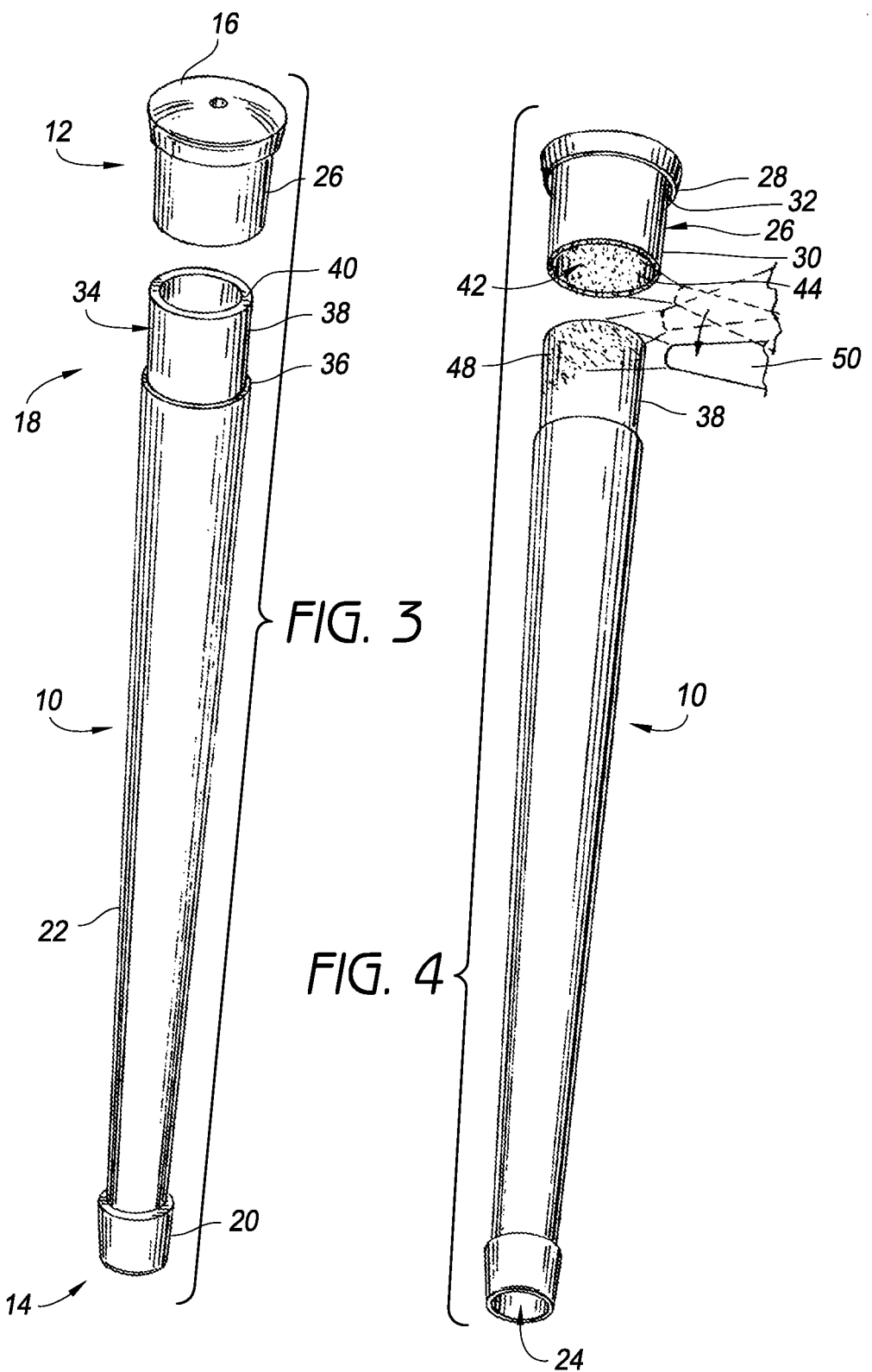

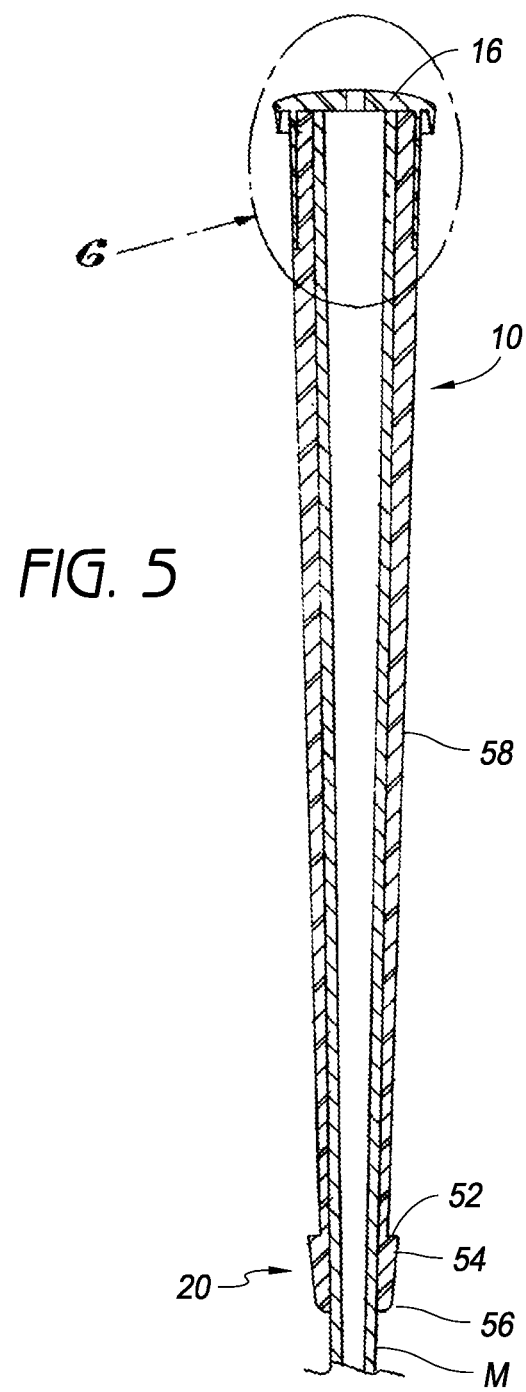

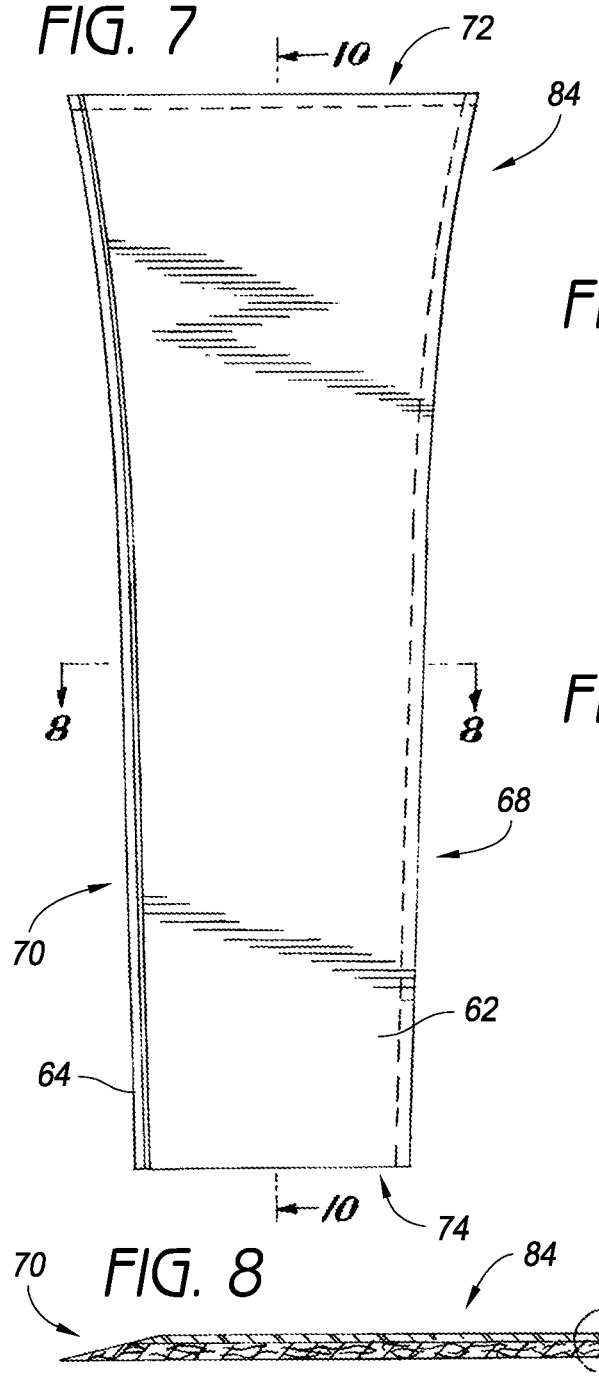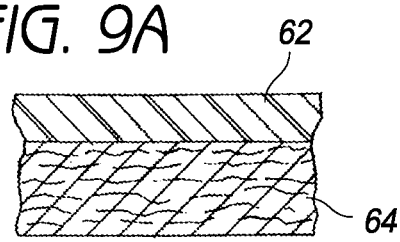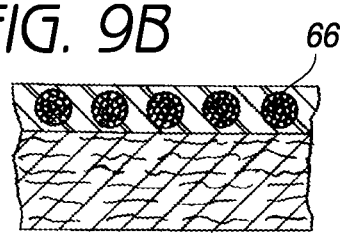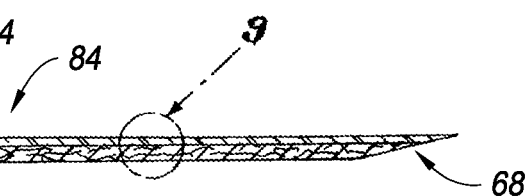

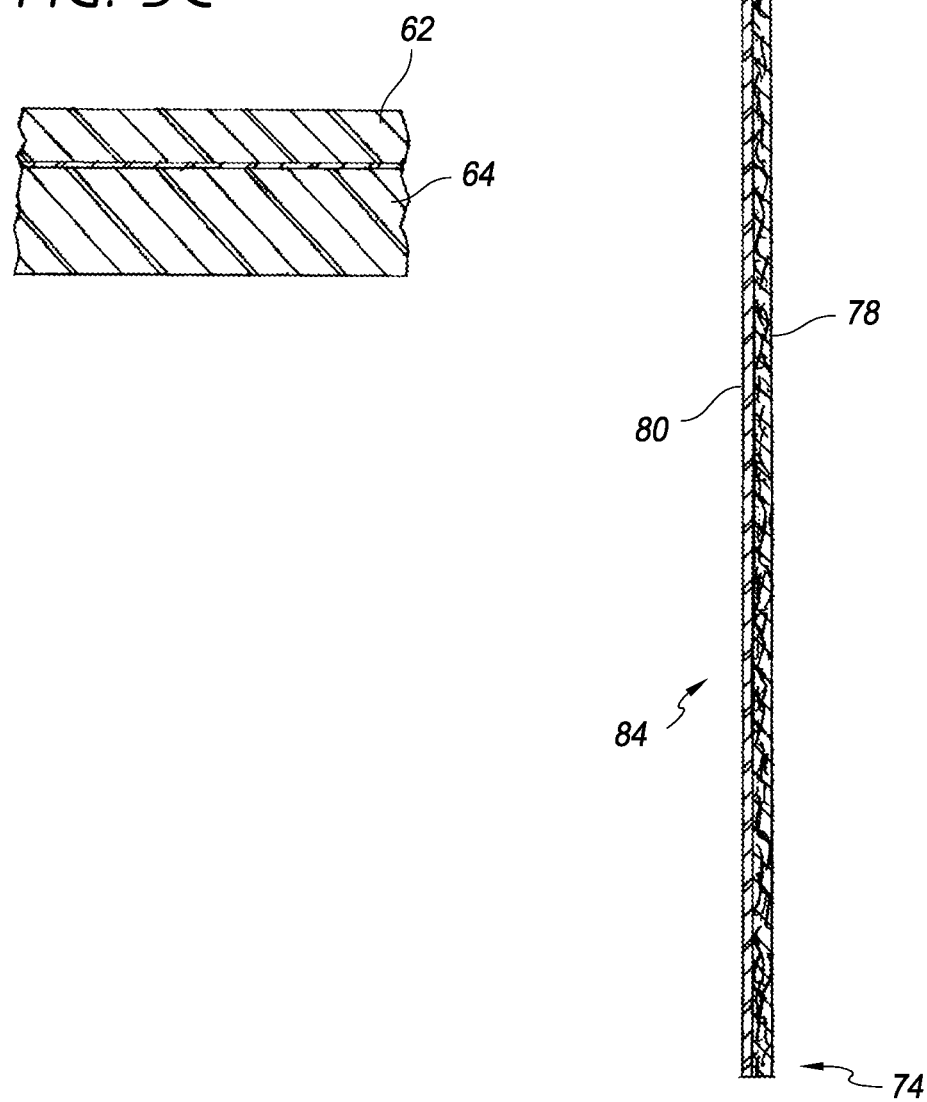

FIG. 11
FIG. 12
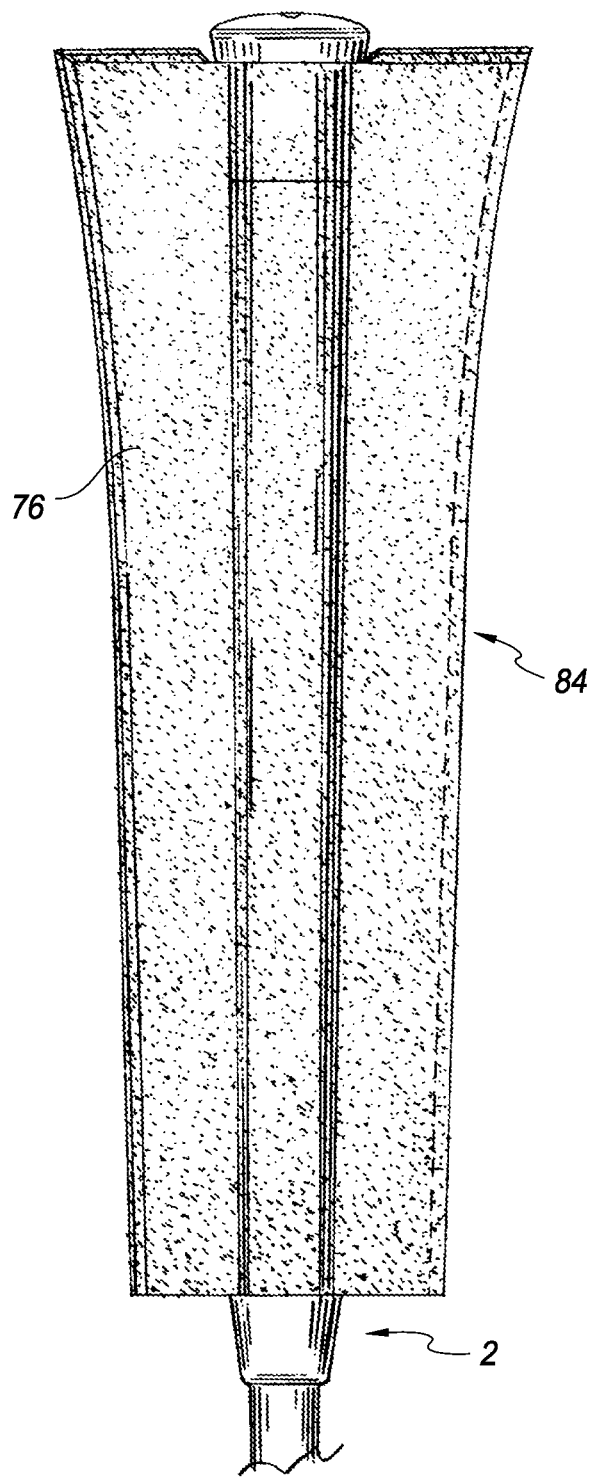
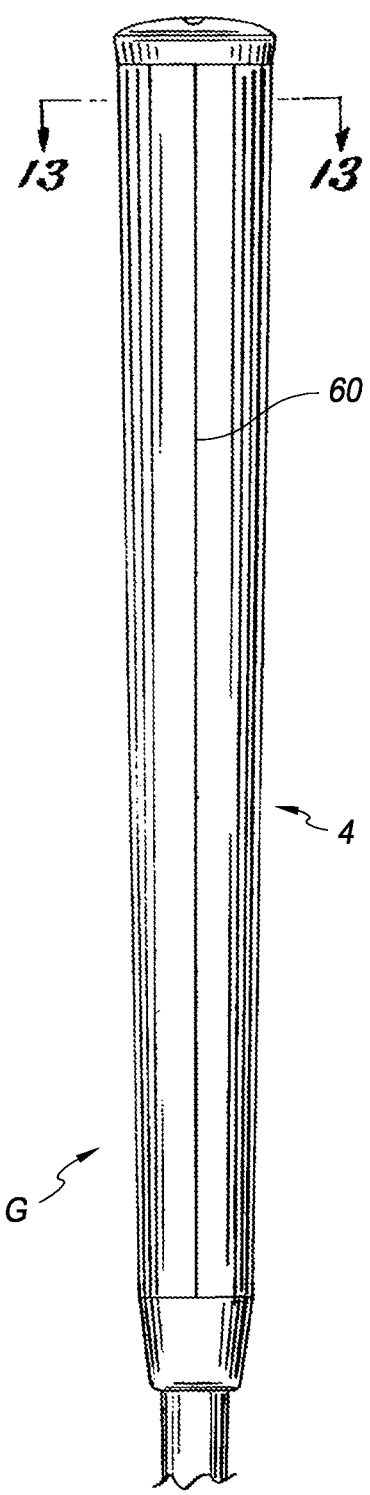

SLEEVE MEMBER FOR USE IN GOLF CLUB GRIPS AND THE LIKE

PRIORITY CLAIM AND INCORPORATION BY REFERENCE

The present application claims the benefit of U.S. Provisional Patent Application No. 61/238,062, filed Aug. 28, 2009 (entitled "IMPROVED SLEEVE MEMBER FOR USE IN GOLF CLUB GRIPS AND THE LIKE"), the disclosure being hereby incorporated by reference in its entirety.

The present application hereby incorporates by reference in their entireties the following U.S. Patents and Publications: U.S. Pat. Nos. 6,627,027, 6,695,713, 6,843,732, and 6,857,971 and U.S. Patent Publication Nos. 2008-0230174 and 2009-0048036.

BACKGROUND OF THE INVENTION

1. Field of the Invention

Embodiments relate to an improved grip for use with the handle portion of articles, in particular, the handle portion of golf clubs, fishing poles, bicycle handles, hand tools, etc.

2. Description of the Related Art

Though grips have been developed, there remains a need for an improved grip.

SUMMARY OF THE INVENTION

Embodiments include one or more advantages including offering great feel by absorbing shock and vibrations caused by the article impacting other objects and being light in weight and of low density. In the context of golf club grips, lighter grips allow for the manipulation of the club swing weight. Current common grips weigh approximately 52 grams. Embodiments of the present invention can reduce the weight of the grip by approximately 32 grams. Generally, decreasing the weight of a grip by approximately 4.5 grams will increase one unit of the club's swing weight. Thus, a 32 gram savings in grip weight can increase a club's swing weight by approximately 7 units. Increased swing weight allows a golfer to hit the ball further with a similar stroke. Further, decreasing the weight of a grip will decrease the total weight of a club, a feature that can be beneficial to older golfers and golfers having less strength. In particular, it enables golfers to create higher head speed and provides easier maneuverability. Furthermore, light weight grips are important for longer shafted clubs which may be preferred by longer distance and taller golfers. In addition, a golfer generally carries approximately 14 clubs in their bag. When that golfer is walking the course or carrying the bag any appreciable distance, it is advantageous to reduce the weight of the bag as much as possible. This can be accomplished by using embodiments of the present grip that are much lighter than standard grips.

In addition, some embodiments permit the use of more resilient materials in areas of high wear. For example, a resilient cap structure can be used at the closed end of the grip. The resilient material is preferably stronger and more dense than the EVA used in the majority of the sleeve.

BRIEF DESCRIPTION OF THE DRAWINGS

Further objects, features and advantages of the inventions will become apparent from the following detailed description taken in conjunction with the accompanying figures showing illustrative embodiments, in which:

FIG. 1 is a perspective view of an exemplary golf club incorporating a grip according to some embodiments;

FIG. 2 is a perspective view of a grip component mounted on a mandrel according to some embodiments;

FIG. 3 is an exploded perspective view of the grip component shown in FIG. 2 according to some embodiments;

FIG. 4 is a perspective view of the grip component shown in FIG. 2 during the manufacturing process according to some embodiments;

FIG. 5 is a section view taken along the line 5-5 in FIG. 2;

FIG. 7 is a front view of a gripping member configured for use with the grip component shown in FIG. 2 according to some embodiments;

FIG. 8 is a section view of the gripping member shown in FIG. 9 taken along the line 8-8 in FIG. 7;

FIGS. 9A-9C are enlarged views of alternate embodiments of a portion designated by the circle 9 in FIG. 8 demonstrating various embodiments of gripping member;

FIG. 10 is a section view of taken along the line 10-10 in FIG. 7;

FIG. 11 is a front view of a grip component and a gripping member during the manufacturing process according to some embodiments;

FIG. 12 is a completed grip according to some embodiments;

Figure 6:
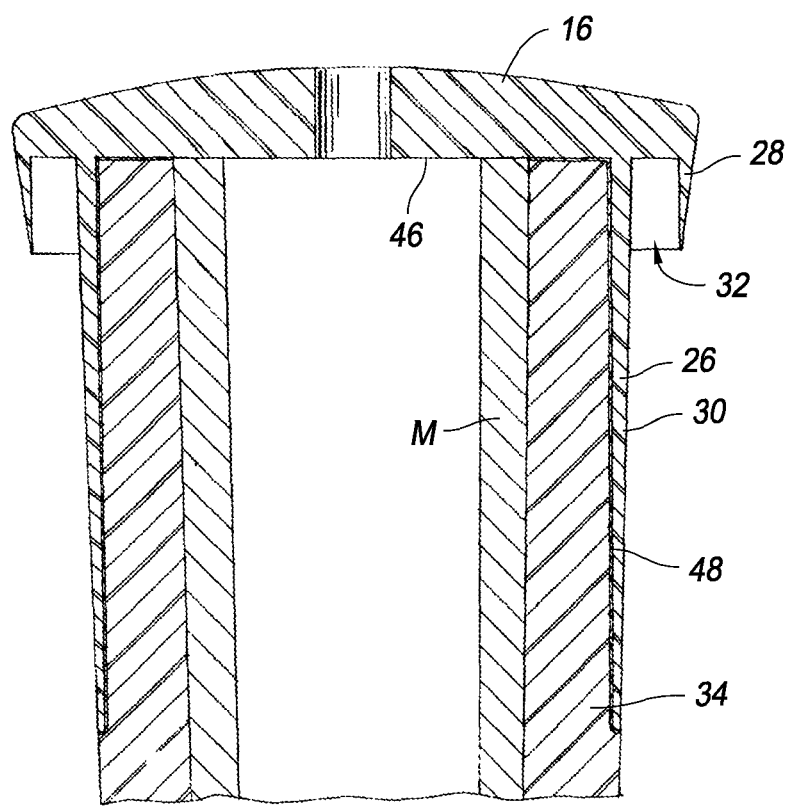
FIG. 6 an enlarged view of the portion designated by the circle 6 in FIG. 5.

While embodiments will now be described in detail with reference to the figures, it is intended that changes and modifications can be made to the described embodiments without departing from the true scope and spirit of the disclosure herein.

DETAILED DESCRIPTION OF THE PREFERRED EMBODIMENT

FIG. 1 is a perspective view of a golf club GC incorporating a grip G according to some embodiments. Embodiments of the grip G can include a base member (also referred to herein as underlisting, sleeve, or sleeve member) 2 and a gripping portion 4. In some embodiments, sleeve 2 preferably includes 2 or more components as discussed in greater detail below.

FIG. 2 is a front view of the sleeve member 2 according to some embodiments and FIG. 3 is an exploded view. The sleeve 2 has a first end 6 and a second end 8 and can comprise a body or first portion 10 and a closure or second portion 12, wherein the first portion 10 includes a first or receiving end 14 preferably configured to receive a rigid stabilizing member, which may be a mandrel M (shown), useful during the construction of a grip, or the handle portion of a shaft S of a golf club, bike handle, fishing pole, hammer, etc. The second portion 12 includes a substantially enclosed end member or cap 16 and is configured to couple to a second end 18 of the first portion 10.

In the illustrated embodiment, the first end 14 of the first portion 10 includes an integral nipple 20. In some embodiments, the nipple 20 is not integrally formed with the first portion 10 and is instead separately manufactured and subsequently joined, bonded, or otherwise attached to the first portion 10 of the sleeve 2 as described, for example, in greater detail below. In some embodiments, such a nipple is connected before a gripping member 84 is applied to the sleeve 2, though in some embodiments it is connected after or not at all. The nipple 20 generally provides a transition, preferably tapered, from the shaft S of the article to the gripping portion 4 of the grip G as described in greater detail below.

The second portion 12 includes a cap 16 and is configured to couple to the second end 18 of the first portion 10. Preferably, the second portion 12 is not integrally formed with the first portion 10 of the sleeve 2 to facilitate the use of multiple materials to enhance the benefits of grips made according to embodiments disclosed herein. A mounting surface 22 generally extends between the first and second ends 6, 8 of the sleeve 2 and the sleeve 2 generally defines an internal cavity 24 configured to receive at least a portion of the handle portion the rigid member, e.g. golf club shaft, fishing pole, hammer, etc.

In a preferred embodiment, the first portion 10 and the second portion 12 comprise different materials. The first portion 10 is generally constructed so as to minimize its weight. In some embodiments, the first portion 10 comprises injected molded ethylene vinyl acetate (EVA) which can be controlled so as to produce a lightweight, stable structure well suited as a base member for a grip G. In some embodiments, alternative materials or methods may be used. For example, the first portion 10 may comprise EVA that has been generically formed and later ground down to the preferred shape as dictated by the particular application. In the case of golf grips, the shape generally tapers from a larger butt end to a narrower nipple end as described herein. Other shapes, be it ground or injection molded, are also possible. For example, generally hour glass shapes may be useful in such applications as fishing pole grips. Similarly, generally straight or ovular shapes may be useful for bicycle handles or tool handles.

The second portion 12 is generally constructed of a more resilient, durable material, for example rubber. In some embodiments, the second portion is injection molded. The material selected can provide more resiliency to better absorb abrasive forces when the article is manipulated during use. For example, if it is a golf club grip, the rubber second portion 12 can withstand the stresses placed on the end of the grip G as the club GC is removed and inserted into a golf bag better than the weight minimizing materials used in the majority of the sleeve 2. In addition, the resilient rubber can be formed to include a slot 32 as described below to assist in holding a gripping member 84 to the sleeve 2.

As illustrated in FIGS. 3 and 4, the second portion 12 preferably includes a cap 16 and a longitudinally extending section or portion 26 which extends from the cap 16 generally toward the first end 14 of the first portion 10. A radial flange 28 also extends longitudinally from the cap 16 and is radially spaced from the longitudinally extending portion 26. The outer mounting surface 30 of the longitudinally extending portion 26 cooperates with the radial flange 28 to form a circumferential slot 32. In some embodiments, the slot 32 accepts a portion of a gripping member 84 adherred to the sleeve 2. Slot 32 reduces the likelihood that the end of the gripping member 84 at the cap end 8 of the sleeve 2 will unravel or curl away from the sleeve 2 during use. Though the resilient material used in the second portion 12 is heavier and more dense than the material used in the first portion 10, the amount of resilient material is limited by using it only in particular areas, such as at the second end 8 of the sleeve 2.

The second end 18 of the first portion 10 can include a reduced diameter engagement section or portion 34 configured to engage the second portion 12. The mounting surface 22 of the first portion 10 is connected to the circumferential surface 38 of reduced diameter portion 34 by a radial annular surface 36. End surface 40, circumferential surface 38 of reduced diameter portion 34, and radial surface 36 preferably provide engagement surfaces for the coupling of second portion 12 to first portion 10.

The second portion 12 defines an inner cavity 42 defined by inner radial walls 44 of the longitudinally extending portion 26 and an inner surface 46 (shown in FIG. 6) of the cap 16. FIG. 4 shows glue 48 being applied by, for example, a spray nozzle 50, to one or more of the walls 44, 46 of inner cavity 42 of the second portion 12 and to one or more of the engagement surfaces 36, 38, 40 of the second end 18 of the first portion 10 prior to coupling of the first portion 10 and the second portion 12. The coupling of first portion 10 and second portion 12 is shown in greater detail in FIGS. 5 and 6.

With glue 48 applied to the inner cavity 42 of the second portion 12 and/or one or more of the engagement surfaces 36, 38, 40 of the second end 18 of the first portion 10, the first and second portions 10, 12 can be fixedly engaged, as shown in FIG. 6. Though it is preferred that each of the surfaces of the first portion 10 engage and be glued to the respective surfaces of the second portion 12, it is possible to limit the areas which receive glue 48. Preferably, the depth of the reduced diameter portion 34 of first portion 10 is generally equal to the thickness of the longitudinally extending portion 26 so that, when engaged, the mounting surface 22 of the first portion 10 and the mounting surface 30 of the longitudinally extending portion 26 preferably define a substantially continuous mounting surface 58 of the sleeve 2.

In some embodiments, the longitudinally extending portion 26 is configured to be as thin as possible while providing sufficient strength to appropriately couple the second portion 12 to the first portion 10. In some embodiments, the average thickness of the wall of the reduced diameter portion 34 is between approximately 2 and approximately 8 times as thick as the average thickness of the wall of the longitudinally extending portion 26. In some embodiments, the reduced diameter portion 34 is approximately 3 to approximately 6 times as thick as the longitudinally extending portion. In a preferred embodiment, the reduced diameter portion 34 is approximately 4 times as thick as the longitudinally extending portion. So long as the first portion and second portion cooperate to provide sufficient strength and durability, since the first portion is constructed of a less dense, lighter material, it is preferable to maximize the amount of first portion material used and minimize the amount of second portion material used to enhance the weight savings of the embodiment.

It is desirable that the second end 18 of the first portion 10 and the second portion 12 are constructed for mating engagement that results in a usable mounting surface 22 on sleeve 2. Second portion 12 is illustrated including a thin walled, longitudinally extending portion 26 that extends entirely around the reduced diameter portion 34. In a preferred embodiment, this produces a substantially smooth mounting surface 22. In some embodiments, the longitudinally extending portion may include two or more sections such that the longitudinally extending portion does not extend entirely around the reduced diameter portion. In such embodiments, reduced diameter portion 34 may be of substantially constant outer diameter, as shown, or may include two or more areas of increased and decreased outer diameter to complement the two or more sections of the longitudinally extending portion.

Some embodiments may further include one or more raised portions on the sleeve 2 that can cooperate with the gripping member 84 to form the gripping portion 4 of the grip G. The raised portions can be integrally formed with the first portion 10 of the sleeve 2, such as by way of a modified injection mold including cavities for such raised portions. Alternatively, the raised portions can be attached to one or both of the first and second portions 10, 12 of the sleeve. Sleeves with raised portions which cooperate with gripping members to form gripping portions of grips are described in greater detail, for example, in U.S. Patent Publication Nos. 2008-0230174 and 2009-0048036.

As shown and discussed above, in some embodiments the nipple 20 may be tapered to provide a smooth transition from the smaller diameter exposed handle, rod, or shaft near the nipple to the main gripping portion 4 of the grip G. The nipple 20 may be integrally formed with the sleeve 2 or may be separately formed and later joined to the sleeve 2. As shown, in some embodiments, the nipple 20 may define a circumferential nipple ledge extending around the first portion 10 and extending radially outward from the mounting surface 22 of the first portion 10 adjacent the mounting surface 22. The nipple ledge may comprise a nipple contact surface 52 and a nipple outer surface 54. The nipple outer surface 54 may transition into the tapered upper portion 56 of the nipple 20.

In the illustrated embodiment, the nipple contact surface 52 extends radially from the mounting surface 22 at approximately 90 degrees. In some embodiments, the nipple contact surface 52 extends from the mounting surface 22 between approximately 45 and approximately 90 degrees. In some embodiments, the nipple contact surface 52 extends from the mounting surface 22 between approximately 90 and approximately 135 degrees.

FIGS. 7-10 illustrate a gripping member 84 according to some embodiments useful in forming at least a portion of the gripping portion 4 of a grip G. The gripping member 84 is shaped to generally correspond with the mounting surface 58 of the sleeve 2 when applied thereto. Shown as a panel, the illustrated embodiment is folded or wrapped around the mounting surface 58 (FIG. 11) to form a substantially vertical seam 60 (FIG. 12) that joins the side edges of the panel as described in greater detail below. Alternatively, the gripping member 84 could be formed as a strip that would in turn be spirally wrapped around the mounting surface 58. In some embodiments, multiple panels and/or strips may be incorporated. Further, panels or strips with cut-outs and/or panels or strips with cut-outs and inserts may be incorporated.

FIG. 8 is a section view of the gripping member 84 taken along the line 8-8 in FIG. 7. In some embodiments, the gripping member 84 preferably includes an outer layer 62 adhered, bonded, glued, or otherwise attached to a base or inner layer 64. The outer layer 62 defines an inner surface and an outer surface and is preferably polyurethane, though suitable other materials may be used. Similarly, the inner layer 64 defines an inner surface and an outer surface and is preferably a non-woven fabric. In some embodiments, a spray-on adhesive is applied to one or both of the inner surface of the outer layer 62 and/or the outer surface of the inner layer 64. In some embodiments, the outer layer 62 of polyurethane is deposited onto and coagulated directly onto and into a portion of the inner layer of felt 64 as shown in FIG. 9A. Such a wet coagulation process is known in the art. See, for example, U.S. Pat. No. 6,857,971. The panel 84 may also include multiple segments, as described, for example, in U.S. Pat. No. 6,843,732.

Side edges 68, 70 are preferably skived to allow an overlapping of the side edges 68, 70 along the seam 60. In alternative embodiments, the side edges 68, 70 are not skived, or are skived to permit stitching or other bonding methods along the seam 60. FIG. 10 is a section view taken along the line 10-10 in FIG. 7. In a preferred embodiment, top edge 72 is skived to facilitated the insertion of the top edge 72 into the slot 32 of the second portion 12. The bottom edge 74 is preferably configured to substantially match the nipple contact surface 52. In a preferred embodiment, the bottom edge 74 is not skived.

FIG. 9A is an enlarged view of a portion of the gripping member 84 designated by the circle 9A in FIG. 8. As mentioned above, the outer layer 62 preferably includes polyurethane. The polyurethane is preferably coagulated to form one or more closed cells (not shown). The inner layer 64, when formed of a non-woven fabric layer, may be fabricated of suitable materials such as nylon, cotton, polyester, or the like and may be felt.

Some embodiments provide a lightweight grip with sufficient torsion resistance and shock absorption for use with a variety of articles including golf clubs. In some embodiments, a finished grip G including a polyurethane/felt gripping member 84 adhered to a combination EVA/rubber sleeve 2 as disclosed herein weighs between approximately 15 and 45 grams. In a preferred embodiment, the finished grip G weighs approximately 20 grams while still providing the desired shock absorption, tackiness, and torsion resistance required of a grip G for an article such as a golf club.

FIG. 9B illustrates the portion shown in FIG. 9A according to some alternative embodiments. In FIG. 9B, an additional woven fabric mesh 66 is included in the polyurethane layer 62 during the manufacturing process. In some embodiments, the fabric mesh 66 is attached to the non-woven fabric layer prior to depositing the polyurethane onto the fabric layer. Such a process is known in the art. See, for example, U.S. Pat. No. 6,695,713.

In some embodiments, the fabric mesh 66 includes longitudinally extending fibers (fibers that extend generally along the length of the long axis of a grip for a grip formed by a panel (e.g. FIG. 12) or along the long axis of a strip where the finished grip is formed from a spirally wrapped strip) and transversely extending fibers. In some embodiments, the longitudinally extending fibers will preferably be of a larger diameter than the transversely extending fibers. For example, the longitudinal fibers may have a diameter between approximately 0.4 and 0.75 millimeters and the transverse fibers may have a diameter between approximately 0.25 and 0.5 millimeters. In some embodiments, the longitudinal and transverse fibers may be of substantially equal diameters. The woven fabric mesh 66 may be fabricated of suitable materials such as nylon, cotton, polyester, or the like.

FIG. 9C illustrates the portion shown in FIG. 9A according to some alternative embodiments. In FIG. 9C, the lower layer 64 comprises EVA rather than non-woven fabric. Attaching polyurethane to an EVA base layer is known in the prior art. See, for example, U.S. Pat. No. 6,627,027.

Figure 13:
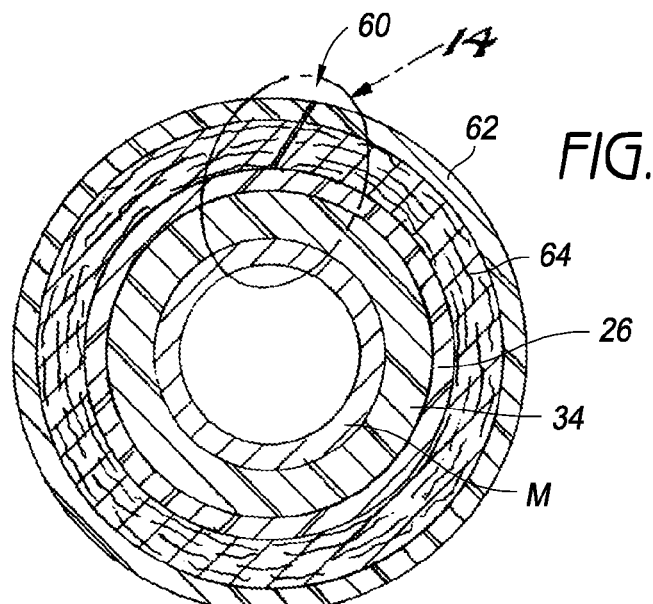
FIG. 13 is a section view taken along the line 13-13 of the grip shown in FIG. 12.
Figure 14A:
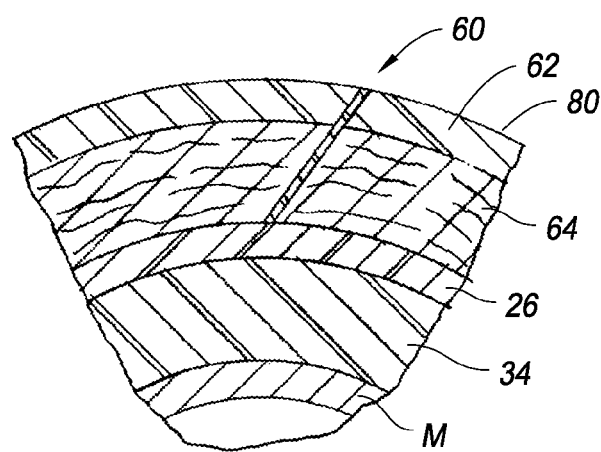
FIGS. 14A-14B are enlarged views of a portion designated by the circle 14 in FIG. 13 demonstrating various embodiments.
Figure 14B:
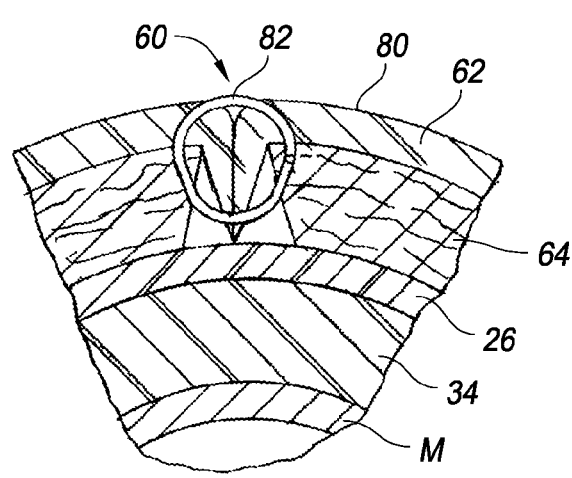

FIGS. 11-14B show the application of the gripping member 84 in a panel shape onto a sleeve 2 according to some embodiments. An adhesive 76 is sprayed or otherwise applied onto the mounting surface 58 of the sleeve 2, the inner surface 78 of the gripping member 84 or both as shown and the panel 4 is wrapped around the mounting surface 58. As discussed above, in some embodiments, the side edges 68, 70 of the panel 4 can be skived so as to overlap along the seam 60 with like layers generally contacting and adhered to like layers as shown in FIGS. 13 and 14A. Alternatively, the side edges 68, 70 can be skived such that the outer surface 80 of the panel 4 at or near the side edges 68, 70 contact each other along the seam 60. In some embodiments, such a seam 60 is stitched closed with the stitches 82 preferably extending through at least a portion of the polyurethane outer layer 62 and at least a portion of the non-woven inner layer 64 as shown in FIG. 14AB In some embodiments, the panel 4 is stitched inside out with the outer surface 80 of the polyurethane layer 62 facing inwards and, after stitching the seam 60, the panel 4 is reversed as or before it is applied to the sleeve 2 such that, on the finished grip G, the outer surface 80 is outward facing.

In some embodiments, the thickness of the panel 4 corresponds generally to the distance the nipple contact surface 52 extends from the mounting surface 22 of the first portion 10 to facilitate the creation of a smooth transition from the gripping member 84 to the nipple 20.

As discussed above, in some embodiments, a portion of the sleeve 2 is constructed from a less dense material. For example, first portion 10 may be manufactured from injection molded EVA. Ethylene vinyl acetate copolymers possess many excellent characteristics such as low weight, low density, flexibility, transparency, non-toxicity, and good resistance to environmental stress cracking, etc.

Some embodiments overcome the difficulties of working with injection molded EVA. For example, EVA coagulation is a relatively slow process. After injection molding a rough EVA first portion 10, the section can be transferred to an appropriate mold with a core bar to control the shape of the finished product. Controlling temperature and time facilitates effective control of the EVA coagulation.

In some embodiments, the density of the EVA injected to form the first portion 10 is less than approximately 1 g/cm$^3$. In some embodiments, the density is between approximately 0.5 and 1.5 g/cm$^3$. In a preferred embodiment, the density is between approximately 0.930 and 0.943 g/cm$^3$. Controlling the degree of coagulation of the EVA allows embodiments to include an EVA first portion 10 whose volume is, for example, approximately doubled or tripled from the original volume. Therefore, in some embodiments, the density of the finished first portion can be approximately one half or one third of the original density. In some embodiments, the density of the finished first portion can be between approximately 0.25 and 1.0 g/cm$^3$. In some embodiments, the density of the finished first portion can be between approximately 0.3 and 0.6 g/cm$^3$.

In some embodiments, portions of the sleeve 2 are of low density, however, given varying shapes and sizes of grips envisioned, the weights of the sleeves may vary. For example, embodiments can be used to control the weight of oversized putter grips that are gaining in popularity. In some embodiments, the weight of the finished sleeve 2, including the first portion 10 and second portion 12, can be between approximately 5 and 40 g. In some embodiments, the weight of the finished sleeve can be between approximately 10 and 30 g. In some embodiments, the weight of the finished sleeve can be between approximately 10 and 25 g. In some embodiments, the weight of the finished sleeve can be between approximately 15 and 20 g. In some embodiments, the weight of the finished sleeve can be between approximately 7 and 12 g. In a preferred embodiment, the finished sleeve weighs approximately 10 g.

One or more aspects of each of the embodiments described herein can be combined with one or more aspects of other embodiments and such combinations are specifically contemplated herein. Further, general modifications of the disclosure are also contemplated.

What is claimed is:

1. A grip for, the handle portion of an article, the grip comprising a first open end configured to receive at least a portion of the handle portion of the article and a second end opposite the first end, the grip comprising:

an ethylene vinyl acetate first portion including a first open end, a second end, and a first outer mounting surface, the first end corresponding to the first end of the grip and configured to receive at least a portion of the handle portion of the article and the second end opposite the first end of the first portion and including a first engagement section;

a rubber second portion comprising a cap and a longitudinally extending second engagement section defining a second outer mounting surface, the second engagement section of the second portion being coupled with the first engagement section of the first portion at the second end of the grip;

wherein the first mounting surface of the first portion defines a first outer diameter adjacent the first engagement section and the first engagement section defines a second outer diameter, the second mounting surface of the second engagement section of the second portion, when positioned over the first engagement section, defines a third outer diameter substantially equal to the first outer diameter and wherein the first mounting surface and the second mounting surface define a mounting surface of a sleeve; and a gripping member adhered to the mounting surface of the sleeve.

2. A grip according to claim 1, wherein the first portion has a density between approximately 0.25 and 0.75 g/cm$^3$.

3. A grip according to claim 2, wherein the density of the first portion is between approximately 0.3 and 0.6 g/cm$^3$.

4. A grip according to claim 1, wherein the sleeve has a weight between approximately 10 and 30 g.

5. A grip according to claim 1, wherein the weight of the sleeve is between approximately 15 and 20 g.

6. A grip according to claim 1, wherein the ethylene vinyl acetate first portion is injection molded.

7. A grip according to claim 1, wherein the ethylene vinyl acetate first portion is ground down to shape from a block of ethylene vinyl acetate foam.

8. A grip according claim 1, wherein the gripping member is shaped as a panel, the panel being wrapped around the mounting surface and adhered to the mounting surface.

9. A grip according claim 8, wherein the panel includes side edges forming a generally longitudinal seam, the side edges being skived.

10. A grip according claim 9, wherein the skived side edges are skived such that they overlap along the seam.

11. A grip according claim 10, wherein the panel includes multiple layers and like layers of the panel are in contact with and adhered to like layers along the seam.

12. A grip according claim 9, wherein the skived side edges are stitched together along the seam with an outer surface of the panel adjacent the first side edge is in contact with the outer surface of the panel adjacent the second side edge along the stitched seam.

13. A grip according claim 1, wherein the mounting surface is substantially continuous.

14. A golf club including a grip according to claim 1, wherein said golf club includes a shaft having a head end and said handle portion positioned opposite the head end, wherein said grip is positioned on said handle portion such that said first end of said grip is positioned closer to said head end than said second end of said grip.

* * * * *

UNITED STATES PATENT AND TRADEMARK OFFICE
CERTIFICATE OF CORRECTION

PATENT NO.        : 8,480,510 B2                                              Page 1 of 1
APPLICATION NO.   : 12/862673
DATED             : July 9, 2013
INVENTOR(S)       : Huang It is certified that error appears in the above-identified patent and that said Letters Patent is hereby corrected as shown below:

On the Title Page

In column 2 (page 1 item 56) at line 18, Under Other Publications, change "Adhession" to --Adhesion--.

In the Specification

In column 3 at line 54, change "adherred" to --adhered--.
    In column 6 at line 66, change "14AB In" to --14 A, B. In--.

In the Claims

In column 8 at line 38, In Claim 8, change "according" to --according to--.
    In column 8 at line 41, In Claim 9, change "according" to --according to--.
    In column 8 at line 44, In Claim 10, change "according" to --according to--.
    In column 8 at line 46, In Claim 11, change "according" to --according to--.
    In column 8 at line 49, In Claim 12, change "according" to --according to--.
    In column 8 at line 54, In Claim 13, change "according" to --according to--.

Signed and Sealed this
Eighteenth Day of March, 2014

Michelle K. Lee
*Deputy Director of the United States Patent and Trademark Office*